(12) United States Patent
Pressmar

(10) Patent No.: US 11,982,224 B2
(45) Date of Patent: May 14, 2024

(54) CRANK MECHANISM FOR THE USE IN AN IN-LINE BOXER ENGINE

(71) Applicant: Hendrik Pressmar, Zürich (CH)

(72) Inventor: Hendrik Pressmar, Zürich (CH)

( * ) Notice: Subject to any disclaimer, the term of this patent is extended or adjusted under 35 U.S.C. 154(b) by 0 days.

(21) Appl. No.: 18/049,922

(22) Filed: Oct. 26, 2022

(65) Prior Publication Data

US 2023/0129546 A1    Apr. 27, 2023

(30) Foreign Application Priority Data

Oct. 27, 2021    (CH) ............................. 070454/2021

(51) Int. Cl.
*F02B 75/24* (2006.01)
*F02B 75/32* (2006.01)

(52) U.S. Cl.
CPC ............ *F02B 75/243* (2013.01); *F02B 75/32* (2013.01)

(58) Field of Classification Search
CPC .............................. F02B 75/243; F02B 75/32
See application file for complete search history.

(56) References Cited

U.S. PATENT DOCUMENTS 6,202,537 B1 * 3/2001 Havran .................. F04B 27/02
92/72

FOREIGN PATENT DOCUMENTS

| DE | 60301759 | T2 | 7/2006 | |
|----|----------|----|--------|---|
| DE | 102008031993 | A1 | 1/2010 | |
| DE | 102014018561 | B3 * | 1/2016 | ............. F02B 75/32 |
| DE | 102015001893 | B3 | 5/2016 | |
| EP | 1367239 | A2 | 12/2003 | |
| WO | WO-03095813 | A1 * | 11/2003 | ............. F01B 1/08 |

OTHER PUBLICATIONS

Machine Translation of DE102014018561B3 PDF File Name: "DE102014018561B3_Machine_Translation.pdf".*
US Navy, "Submarine Main Propulsion Diesels, Navpers 16161", Jun. 1946, p. 36 and Fig. 3-1, https://maritime.org/doc/fleetsub/diesel/index.php.
US Navy, "Engineman 3 & 2", Apr. 1987, pp. 77-78.
Wikipedia, "Crankpin", Aug. 4, 2021, https://en.wikipedia.org/w/index.php?title=Crankpin&oldid=1037051424.

* cited by examiner

*Primary Examiner* — Grant Moubry
*Assistant Examiner* — Ruben Picon-Feliciano
(74) *Attorney, Agent, or Firm* — The Webb Law Firm

(57) ABSTRACT

A crank mechanism for the use in an in-line boxer engine has at least two diametrically opposed cylinders, that has a crankshaft and the respective pistons as well as connecting rods for each cylinder of the in-line boxer engine, with the connecting rods cooperatively connecting the pistons with the crankshaft. Each of the connecting rods encompasses a respective piston connecting portion, at one end having bushings accepting a gudgeon pin. At the other end, the central connecting rod has a one-piece crankshaft bearing portion for the crankpin whereas the forked connecting rod has a crankshaft bearing portion with two spaced limbs resultant in bifurcated crankshaft bearing portions for the crankpin. The crankshaft possesses a cylindrical central middle crankpin, that is eccentric towards the crankshaft, onto which a cylindrical outer crank pin is immediately attached at each side without crank webs.

15 Claims, 5 Drawing Sheets

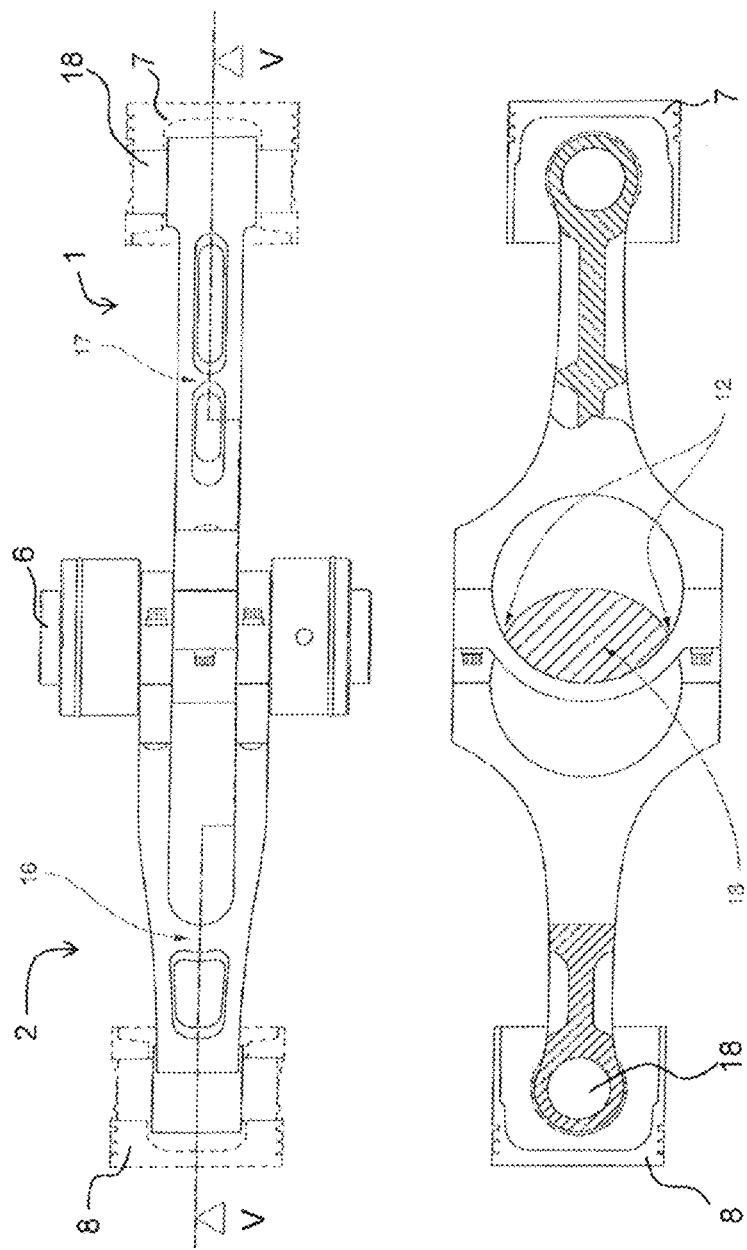

CRANK MECHANISM FOR THE USE IN AN IN-LINE BOXER ENGINE

CROSS-REFERENCE TO RELATED APPLICATION

This application claims priority to Swiss Patent Application No. 070454/2021 filed Oct. 27, 2021, the disclosure of which is hereby incorporated by reference in its entirety.

BACKGROUND OF THE INVENTION

Field of the Invention

The invention on hand concerns the crank mechanism of an boxer engine of so-called "in-line" design having a crankshaft and at least two diametrically opposed cylinders without offset of the cylinders, each opposed cylinder having a piston as well as one or two connecting rods associated therewith, that are connected to the piston and the crankshaft acting together; one of said two connecting rods having portions connecting to the piston, with a gudgeon pin bearing portion at one end and with a crankshaft bearing portion at the other, the other connecting rod having a portion connecting to the piston with a gudgeon pin bearing portion at one end and two forked limbs, spaced apart, with two crankshaft bearing portions at the other end, them connecting to the crankpins.

Description of Related Art

U.S. Pat. No. 6,202,537 B1 describes a crank mechanism of a boxer engine having a crankshaft and at least two diametrically opposed cylinders, each opposed cylinder having a piston and a connecting rod connected to the piston and crankshaft, one of the two connecting rods having a crankshaft bearing portion at one end and a gudgeon pin bearing portion at the other end, the other connecting rod having two spaced limbs with a crankshaft bearing portion at one end of each of the limbs, the other end of the limbs coming together to form a gudgeon pin bearing portion (forked connecting rod). The distance between the limbs is sufficient to allow the crank webs and the portion of the crankshaft connected to the crankshaft bearing portion of one connecting rod to rotate between the surrounding limbs of the other connecting rod, whereby the back-and-forth inertial forces associated with the diametrically opposed cylinders are generally equal in magnitude, opposite in direction, and cancel each other out, resulting in smooth running.

The drawing of an in-line boxer engine that uses two connecting rods instead of a forked connecting rod on one of the two diametrically opposed pistons (tandem connecting rods or double connecting rods) is described in a Wikipedia article at https://de.wikipedia.org/wiki/Boxermotor.

DE 10 2015 001 893 B3 also describes a two-cylinder in-line boxer engine with tandem connecting rods, the design of which enables mass balancing as conventionally achieved without the use of balancing shafts only by six-cylinder engines.

EP 1 367 239 A2 (=DE 603 01 759 T2) discloses a piston for a reciprocating piston engine, the piston comprising a body, a rim encompassing the body, and a socket for receiving a connecting portion of a connecting rod, wherein the connecting portion has a part-spherical surface, and wherein the socket is adapted to engage the part-spherical surface. Thereby, the piston further comprises a perpendicular part extending from the body, the socket comprising an insert received in a recess defined by the perpendicular part being spaced from the rim. The two pistons of the reciprocating engine are thereby arranged directly opposite the central axis of the crankshaft.

DE 10 2008 031 993 A1 pertains to a split-pin-crankshaft with two opposite crank webs and, situated in between the two crank webs, with two crankpins that are adjacent to as well as offset against each other, whereas a concave fillet with a transitory curvature is provided between the two crankpins and a further concave fillet for the adjoining crank web.

SUMMARY OF THE INVENTION

While designing and building internal combustion engines, efforts are made to eliminate, as far as possible, the forces arising from the oscillating pistons, connecting rods and the rotating crankshaft, consisting of crank webs, crank bearings and crankpins by the arrangement and number of the engine's cylinders.

In conventional solutions, however, the crankpins of a crankshaft as well as the pistons and cylinders connected to them by the connecting rods are offset relative to each other with respect to the crankshaft, which causes undesirable forces and torques on the crankshaft and, if necessary, is sought to be compensated for by an increased number of cylinders. A well-known solution to eliminate the disturbing offset of the cylinders from each other is the so-called "in-line" boxer engine. This is a boxer engine with diametrically opposed cylinders without any cylinder offset. The balance of masses of such a two-cylinder in-line boxer engine, be it one with a forked one-piece connecting rod or with two-piece tandem connecting rods, is excellent and resembles that of an in-line six-cylinder engine.

Based on the aforementioned prior art, the invention is based on the task of specifying an improved crank mechanism for an in-line boxer engine, since the known solutions always require far spaced or far diverging connecting rods, which is why either two connecting rods (tandem connecting rods, double connecting rods) or a connecting rod in the form of a fork (forked connecting rod) are used on one side of the engine. The former solution, using tandem connecting rods, however, always requires a large cylinder cross section (bore) in order to have sufficient space between the two connecting rods and their accommodation at the boundaries of the piston crown. The latter solution, using one forked connecting rod with two limbs, requires a very stiff and therefore heavy component such that it is strong enough to withstand the forces of the oscillating piston despite of the substantial gap of the fork, such gap unavoidably spanning a distance of two crank webs and the crankpin of the opposite connecting rod.

According to the invention, the crank mechanism of an in-line boxer engine with the features of the prior art is characterized by the fact that, firstly, a tandem connecting rod is not required as a consequence of the arrangement and shape of the crankshaft in interaction with the connecting rods and that, secondly, the gap between the limbs of the forked connecting rod is minimized so as to better withstand the forces induced by the piston, in that the crankshaft features a cylindrical central middle crankpin which is mounted eccentrically relative to the crankshaft and to which, in the axial longitudinal direction of the crankshaft, cylindrical outer crankpins are connected on both front faces—in each case immediately adjacent and without intervening crank webs—all of which are mounted eccentrically relative to the crankshaft in such a way that the two outer crankpins are arranged on the same outer crankpin longitudinal axis and that a connecting line starting perpendicularly from this outer crankpin longitudinal axis and crossing the eccentric longitudinal axis of the central crankpin would also run through the longitudinal axis of the crank shaft, and that the crankshaft bearing portions of the connecting rods have cylindrical inner surfaces which are placed on the outer surfaces of the crankpins.

According to a first embodiment, the crankshaft bearing portion (the connecting rod eye at the big end) consist of a semi-enclosing bearing shell at the connecting rod and a further semi-enclosing bearing shell, closing off the one, or the two, respective crankshaft bearing portions (split connecting rod eye at the big end). Connecting components are then provided to connect one semi-enclosing bearing shell with the said semi-enclosing bearing shell of the connecting rods, accomplishing a rotary bearing of the respective associated crankpins. The connecting components can be boreholes, some with internal threads, into which connecting bolts with a complementary thread are fastened.

According to a second embodiment, the crankshaft bearing portions of the connecting rod each have one, respectively two, full-circle, cylindrical inner bearing surfaces configured for a rotary bearing of the respective associated crankpins; and the crankshaft has a central shaft with an outer circumferential surface in longitudinal direction of the crankshaft, whereas the central crankpin and the two laterally adjoining outer crankpins have a bore with a complementary inner surface to said outer circumferential surface for a positive locking form fit. Accordingly, the connecting rods' big ends can each be of one piece (non-split) design fully encircling each of the crankpins, the crankpins being further attached to two shaft bearing journals, such that for purposes of assembling the complete crank mechanism, the elements consisting of crankpins and bearing journals are mounted or shrink fitted on the central shaft with the connecting rods already mounted onto them.

The dimensions and mass of the central middle crankpin preferably equals the sum of the dimensions and mass of the two outer crankpins in order to achieve smooth running of the engine.

An in-line boxer engine can also comprise more than two cylinders, especially 4 or 6. Then, the crank mechanism comprises two or more pairs of two diametrically opposed cylinders positioned side by side in the longitudinal direction of the crankshaft with the above mentioned features provided for each pair of two diametrically opposed cylinders.

BRIEF DESCRIPTION OF THE DRAWINGS

Preferred embodiments of the invention are described below with reference to the drawings, which are for explanatory purposes only and do not limit the invention to the illustrated embodiments. In the drawings it is shown:

FIG. 5 is a schematic top view of FIG. 1 with the cylinders arranged symmetrically with respect to the drawing plane; and FIG. 6 is a cross-sectional view according to line "V-V" in FIG. 5.

DESCRIPTION OF THE INVENTION

Figure 1:
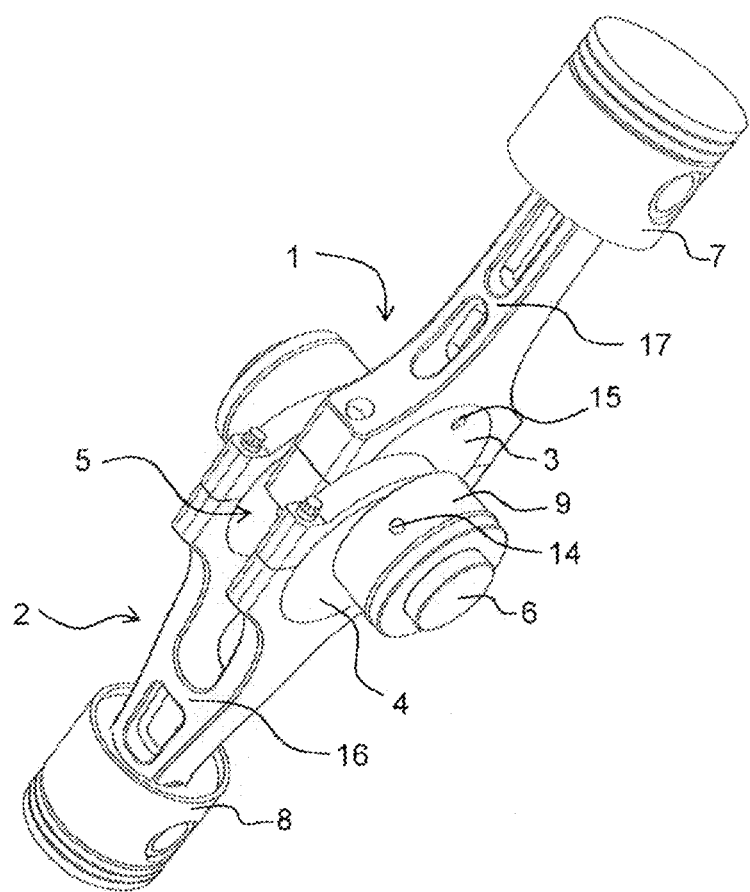
FIG. 1 is a schematic perspective view of the pistons and crankshaft for the use in a two-cylinder in-line boxer engine according to a first embodiment of the invention.

FIG. 1 shows a schematic perspective view of diametrically opposed pistons 7, 8 and crankshaft 6 of a two-cylinder in-line boxer engine according to one embodiment of the invention. The description will, as well, refer to FIG. 2, which shows a schematic perspective exploded view of the components shown in FIG. 1.

Figure 3:
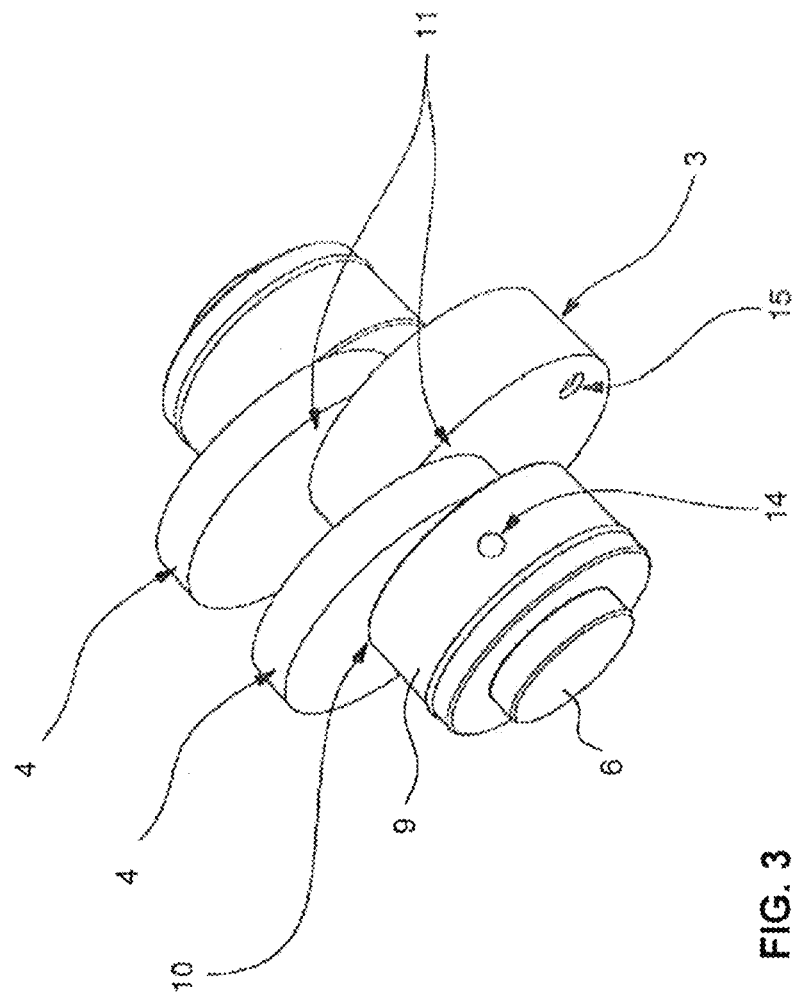
FIG. 3 is a schematic perspective view of the one-piece crankshaft complete with crankpins and shaft bearing journals as shown in FIG. 1.

Part of the description is also FIG. 3, which shows a central schematic perspective view of the one-piece crankshaft 6 shown in FIG. 1 with crankpins 3 and 4.

The crankshaft 6 has two main bearing journals 9 for the bearing of the crankshaft on both sides of the crankpins along the longitudinal axis. Directly adjacent to each bearing journal 9 are the two outer crankpins 4 together with a single central middle crankpin 3 being situated between these two outer crankpins 4. The two outer crankpins 4 and the central middle crankpin 3, the latter situated between the former in the longitudinal direction of the crankshaft 6, are directly adjacent to one another, such that the junctions between a main bearing journal 9 and an outer crankpin 4, on the one hand, and the outer crankpin 4 and the central middle crankpin 3, on the other hand, constitute interjacent, overlapping end faces 10 and concave fillet sections 11.

The, or each, main bearing journal 9 may have a bore 14, compensating for any unbalance. Similarly, the central middle crankpin 3 may have a bore 15 in order to counter any unbalance. The diameter of the central middle crankpin 3 is equal to the diameter of each outer crankpin 4. The two outer crankpins 4 are both equally offset radially relative to the longitudinal axis of the shaft 6. The central middle crankpin 3 is, too, radially offset from the longitudinal axis of the shaft 6 by the same amount as each of the outer crankpins 4, however shifted by 180 degrees thereto, such that the center axis of the outer crankpins 4, the longitudinal axis of the shaft 6, and the center axis of the central middle crankpin 3 lie in a plane.

The respective width of each of the two outer crankpins 4 along the longitudinal axis of the shaft 6 is identical. The width, along the same longitudinal axis, of the central middle crankpin 3 is equal to the sum of the widths of the two outer crankpins 4, whereby the eccentrically moved mass of the two outer crankpins 4 equals the mass of the central middle crankpin 3, such mass eccentrically moving in the opposite direction relative to the position of the masses of the outer crankpins.

Figure 2:
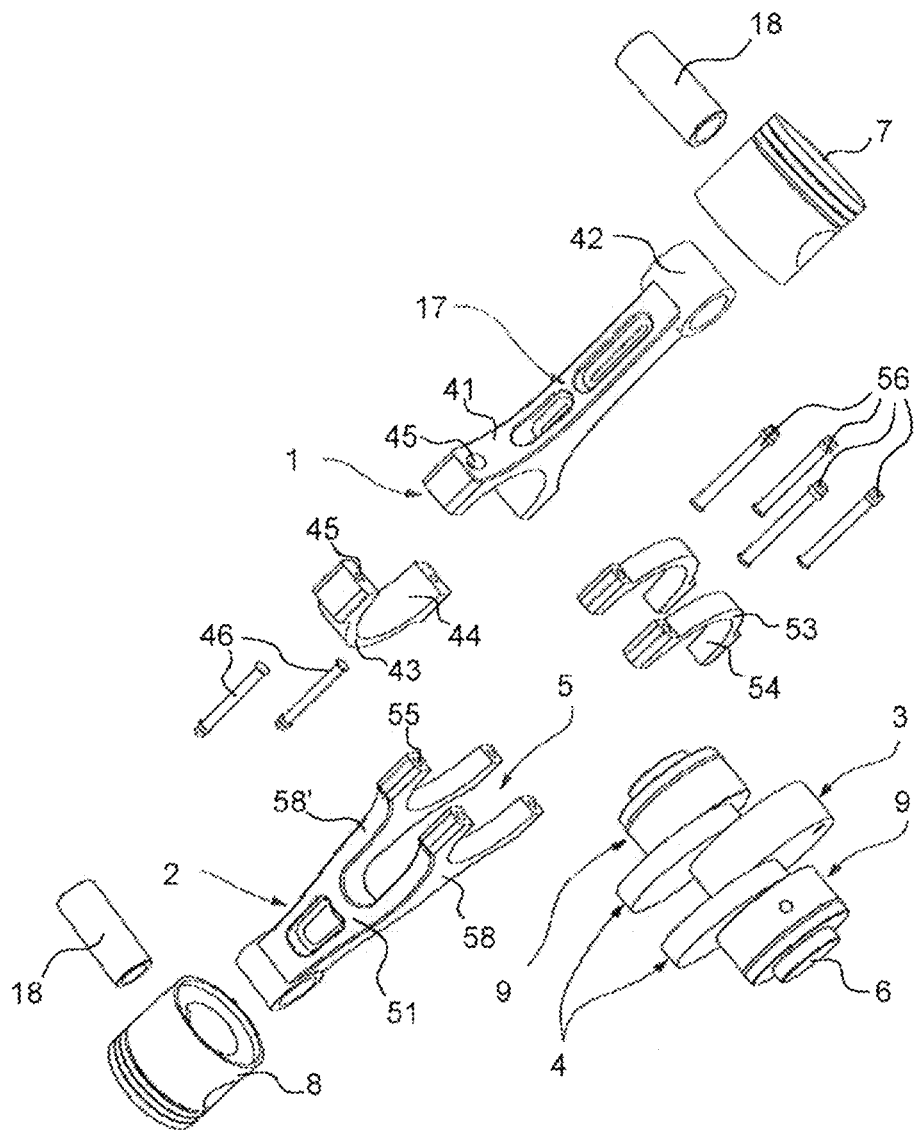
FIG. 2 is the schematic perspective exploded view of the components for the use in a two-cylinder in-line boxer engine as shown in FIG. 1.

This crankshaft 6 together with crankpins 3 and 4 forms the core of the arrangement according to FIG. 1 and FIG. 2. A two-piece central connecting rod 1 is fitted to the central middle crankpin 3. This central connecting rod 1 has a piston connecting portion 41 (connecting rod eye at the connecting rod's big end) with a bushing 42 accepting a gudgeon pin 18 at one free end (connecting rod's small end) while the opposite end is formed by a semi-enclosing bearing shell for a crankpin with a cylindrical inner bearing surface 44, it forming a semicircle with, in this case, flat locating surfaces. The inner diameter of the bearing surface 44 corresponds to the outer diameter of the central middle crankpin 3 to enable rotary movement. The said semi-enclosing bearing shell of the crankpin connecting portion 41 is closed to a full circle by a corresponding semi-enclosing bearing shell 43 to form the connecting rod eye of the connecting rod big end. For this purpose bolts 46 are provided that pass through boreholes 45 in the semi-enclosing bearing shell 43 on both sides of same, and are either bolted into internal threads of the crankshaft connecting portion 41 or fastened by external nuts. The internal threads may alternatively be provided in the semi-enclosing bearing shell 43. A web 17 is, optionally, incorporated into the central connecting rod 1 in order to compensate for the concentration of mass at this point of the opposite, forked connecting rod 2, which necessarily follows from the bifurcation at this point, it being a point in space relative identical to the position of web 17.

The opposite, forked connecting rod 2 has a piston connecting portion 51 with a bushing 52 accepting a gudgeon pin 18 at one free end (connecting rod small end), while such piston connecting portion 51, with respect to the longitudinal axis of the crankshaft 6, perpendicularly bifurcates into a fork arm 58 and another fork arm 58'. Each fork arm 58 and 58' has an end, opposite the bushing accepting a gudgeon pin 52, with a semi-enclosing bearing shell for the crankpin, forming a semicircle as of a cylindrical inner bearing surface 54 with, in this case, flat locating surfaces. The inner diameter of each of the two inner bearing surfaces 54 of the fork arms 58 and 58' corresponds to the outer diameter of each of the associated outer crankpins 4 to enable a rotary movement. The said semi-enclosing bearing shell for the crankpin of the piston connecting portion 51 is closed by another semi-enclosing bearing shell for the crankpin 53, together forming the connecting rod eyes at each of the respective connecting rod big ends. For this purpose bolts 56 are provided that pass through boreholes 55 in the semi-enclosing bearing shell for the crankpin 53 on both opposite sides of same, and are either bolted into internal threads of the connecting portion 51 or fastened by external nuts. The internal threads may alternatively be provided in the semi-enclosing bearing shell for the crankpin 53. Reference sign 16 denotes the concentration of material on the forked connecting rod 2 that is required for the strength of the component as a consequence of the bifurcation at this point.

Each fork arm 58 and 58' has a width along the longitudinal axis of the shaft 6 which, taken together, corresponds to the width of the corresponding portion of the central connecting rod 1. At the same time, any mass may be compensated for by way of corresponding recesses in the connecting rods 1 and 2, with the web 16 being essential and the web 17 serving as a counterweight to compensate for the material concentration of the web 16 at the relative same position.

Figure 4:
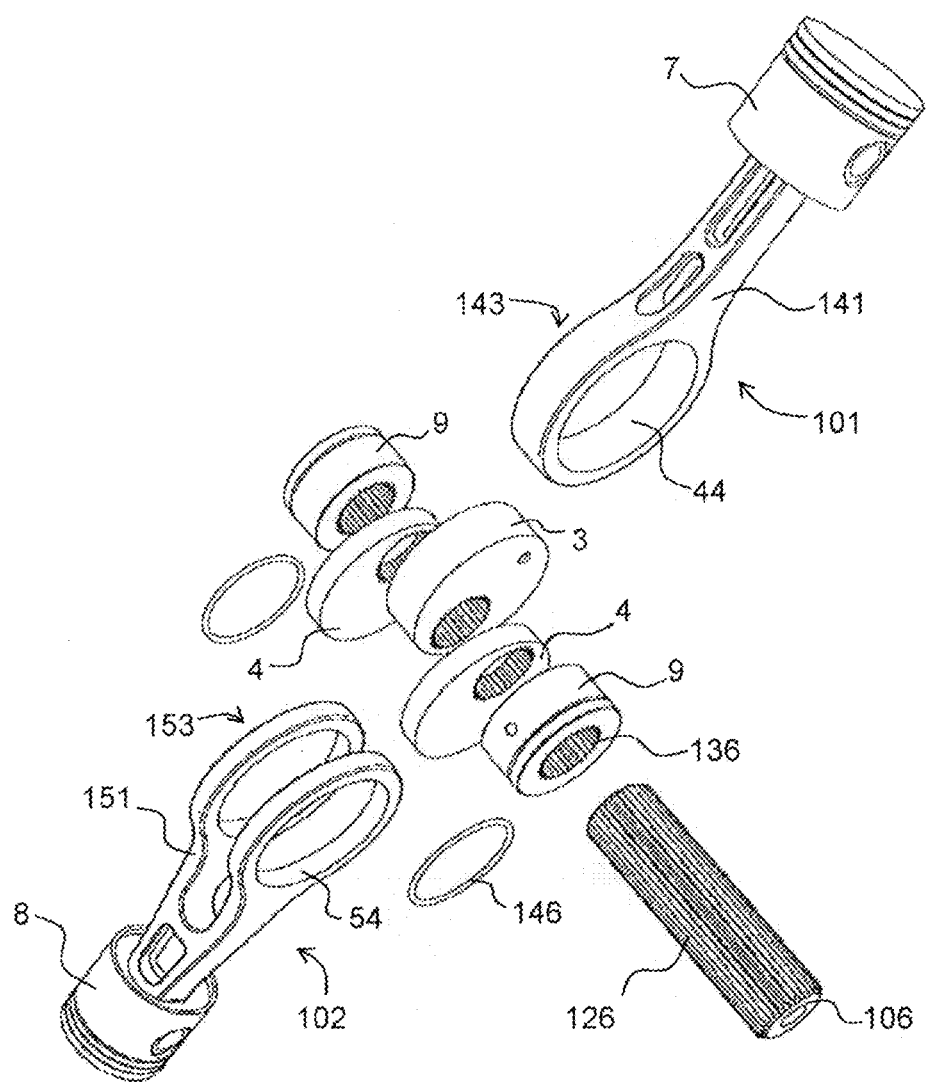
FIG. 4 is a schematic perspective view of the pistons, the multi-piece composite crankshaft consisting of a central shaft, the crankpins and bearing journals for the use in an in-line boxer engine according to a second embodiment of the invention.

FIG. 4 shows a schematic perspective view of connecting rods 101, 102, crankshaft 106 and crankpins 3 and 4 of an in-line boxer engine according to a second embodiment of the invention. The same reference signs have been used here as well where the elements correspond to the elements of the first embodiment according to FIGS. 1 to 3.

The main difference in the two exemplary embodiments is the arrangement of the piston bearing portions 141 and 151 at the connecting rod eyes of the connecting rod's big ends. These are provided integrally, in other words, the cylindrical inner bearing surfaces 44 and 54 are full circles, respectively, such that the construction of the crankshaft 106 differs. It should be noted that the crankshaft 6 of the first embodiment shown in FIG. 1 is a one-piece crankshaft 6 made from a single workpiece and having integral bearing journals. Such a crankshaft 6 cannot be used for the one-piece connecting rods 101 and 102. Therefor the central axial shaft 106, as part of a so-called composite crankshaft, has a circumference 126 that facilitates a positive locking mechanism, in particular by a teethed surface. A main bearing journal 9, an outer crankpin 4, a central middle crankpin 3, a further outer crankpin 4 and a final main bearing journal 9 are fitted as individual elements on this central axial shaft in the same order as on the crankshaft 6. All of these individual elements have an end-to-end bore which provides a centric bearing arrangement for the main bearing journals 9 and an eccentric, 180-degrees opposing bearing arrangement, as explained above, of the outer crankpins 4 and the central middle crankpin 3 by way of an inner surface 136 that is matching to the circumferential surface 126.

A sealing ring 146 is provided on both sides of the crankshaft 6 to seal against the crankcase. The bearings and the crankpins are to be shrunk onto such teethed shaft, but also onto a smooth shaft. Put differently, all parts first have a predetermined oversize so that they could not be assembled at room temperature. Then, the spline shaft is cooled and/or the other parts are heated such that the components can be assembled regardless of the oversize. When all parts are at room temperature, the formerly hot parts have shrunk and the formerly cold parts have expanded, and are thus inseparably joined.

FIG. 5 shows a schematic top view of the view in FIG. 3 with cylinders arranged symmetrically to the drawing plane, and FIG. 6 shows a cross-sectional view according to a line V-V in FIG. 5. Reference sign 13 designates the cross-sectional area formed by the overlapping partial areas of the outer crankpin 4 and the central middle crankpin 3. The— hypothetical, imaginary—surfaces of the central middle and outer crankpins and the bearing journals, which together overlap in the axial direction, indicate by their size the load-bearing capacity of the entire component; in other words, this surface must not be too small, or else the crankshaft would collapse there. Reference sign 12 indicates the pendentive, which is the three-dimensional surface between the circular sections of the various crankpins and bearing journals that converge at this point, and the concave fillet.

REFERENCE NUMERALS LIST

1 central connecting rod
2 forked connecting rod (or Y-connecting rod)
3 central middle crankpin (or crank disk without crank webs)
4 outer crankpin (or crank disc without crank webs)
5 minimized gap between fork arms of the forked connecting rod
6 crankshaft
7 piston of the central connecting rod
8 piston of the forked connecting rod
9 main bearing journal for crankshaft bearing
10 junction at, and by means of, the overlapping end faces of the crankpins
11 concave fillet of the junctions
12 pendentive
13 end face of the joint
14 optional bore for eliminating unbalance
15 optional bore for eliminating unbalance
16 web/bridge of the forked connecting rod
17 optional web/bridge of the central connecting rod
18 gudgeon pin 41 piston connecting portion
42 bushing accepting a gudgeon pin
43 crankshaft bearing portion
44 cylindrical inner bearing surface
45 fastening boreholes
46 connecting bolts
51 piston connecting portion
52 bushing accepting a gudgeon pin
53 crankshaft bearing portion
54 cylindrical inner bearing surface
55 fastening boreholes
56 connecting bolts
58 fork arm
58' fork arm
101 central connecting rod
102 forked connecting rod
106 shaft
126 circumferential surface
136 matching inner surface
141 piston connecting portion
143 crankshaft bearing portion
146 sealing ring
151 piston connecting portion
153 crankshaft bearing portion

The invention claimed is:

1. A crank mechanism for the use in an in-line boxer engine comprising:
   a pair of two diametrically opposed cylinders,
   a crankshaft,
   a piston for each of the diametrically opposed cylinder,
   a corresponding connecting rod for each of the diametrically opposed cylinder,
   whereas one of the connecting rods has a first piston connecting portion with a gudgeon pin bearing at one end and a single crankshaft bearing portion at the other end, and
   whereas the other connecting rod has a second piston connecting portion with a gudgeon pin bearing at one end and a forked crankshaft bearing portion at the other end that bifurcates into two spaced limbs, which surround the single crankshaft bearing portion with the two ends of said limbs,
   wherein the crankshaft has a cylindrical central middle crankpin affixed in a manner that its axis is eccentric and parallel offset relative to the longitudinal axis of the crankshaft, which central middle crankpin is directly adjoined on both of its sides by two cylindrical outer crankpins without intervening crank webs disposed between the central middle crankpin and the two cylindrical outer crankpins, which outer crankpins are eccentric and parallel offset relative to the longitudinal axis of the crankshaft such that the two outer crankpins are arranged on the same longitudinal axis and such that a connecting line starting perpendicularly from this outer crankpin longitudinal axis and crossing the eccentric longitudinal axis of the central middle crankpin would also intersect the longitudinal axis of the crankshaft, and
   wherein the single crankshaft bearing portion as well as the forked crankshaft bearing portion have cylindrical inner bearing surfaces which are mounted on the respective crankpins.

2. The crank mechanism according to claim 1, wherein the single crankshaft bearing portion and the forked crankshaft bearing portion each comprise a semi-enclosing bearing shell that is associated with the respective connecting rod, and a further semi-enclosing bearing shell for closing off the respective crankshaft bearing portions together with connecting elements, joining the further semi-enclosing bearing shells with the said semi-enclosing bearing shells of the connecting rods to provide for a rotary bearing of the respective associated crankpins.

3. The crank mechanism according to claim 1, wherein the single crankshaft bearing portion has one cylindrical inner bearing surface configured for a rotary bearing of the respective associated crankpin, wherein the forked crankshaft bearing portion has two cylindrical inner bearing surfaces configured for a rotary bearing of the two respective associated crankpins, wherein the crankshaft has a central shaft with an outer circumferential surface along the longitudinal axis of the crankshaft, and wherein the central middle crankpin and the two laterally adjoining outer crankpins have a complementary inner surface to said outer circumferential surface for a form fit.

4. The crank mechanism according to claim 1, wherein the width and mass of the central middle crankpin equals the sum of the widths and the sum of the masses of the two outer crankpins.

5. The crank mechanism according to claim 1 for the use in an in-line boxer engine comprising two or more pairs of two diametrically opposed cylinders positioned side by side in the longitudinal direction of the crankshaft.

6. A crank mechanism for the use in an in-line boxer engine comprising:
   a pair of two diametrically opposed cylinders,
   a crankshaft,
   a piston for each of the diametrically opposed cylinder,
   a corresponding connecting rod for each of the diametrically opposed cylinder,
   whereas one of the connecting rods has a first piston connecting portion with a gudgeon pin bearing at one end and a single crankshaft bearing portion at the other end, and
   whereas the other connecting rod has a second piston connecting portion with a gudgeon pin bearing at one end and a forked crankshaft bearing portion at the other end that bifurcates into two spaced limbs, which surround the single crankshaft bearing portion with the two ends of said limbs,
   wherein the crankshaft has a cylindrical central middle crankpin affixed in a manner that its axis is eccentric and parallel offset relative to the longitudinal axis of the crankshaft, which central middle crankpin is directly adjoined on both of its sides by two cylindrical outer crankpins, which outer crankpins are eccentric and parallel offset relative to the longitudinal axis of the crankshaft such that the two outer crankpins are arranged on the same longitudinal axis and such that a connecting line starting perpendicularly from this outer crankpin longitudinal axis and crossing the eccentric longitudinal axis of the central middle crankpin would also intersect the longitudinal axis of the crankshaft,
   wherein a spacing between the two spaced limbs of the other connecting rod is equal to a sum of widths of the central middle crankpin and the two cylinder outer crankpins, and
   wherein the single crankshaft bearing portion as well as the forked crankshaft bearing portion have cylindrical inner bearing surfaces which are mounted on the respective crankpins.

7. The crank mechanism according to claim 6, wherein the single crankshaft bearing portion and the forked crankshaft bearing portion each comprise a semi-enclosing bearing shell that is associated with the respective connecting rod, and a further semi-enclosing bearing shell for closing off the respective crankshaft bearing portions together with connecting elements, joining the further semi-enclosing bearing shells with the said semi-enclosing bearing shells of the connecting rods to provide for a rotary bearing of the respective associated crankpins.

8. The crank mechanism according to claim 6, wherein the single crankshaft bearing portion has one cylindrical inner bearing surface configured for a rotary bearing of the respective associated crankpin, wherein the forked crankshaft bearing portion has two cylindrical inner bearing surfaces configured for a rotary bearing of the two respective associated crankpins, wherein the crankshaft has a central shaft with an outer circumferential surface along the longitudinal axis of the crankshaft, and wherein the central middle crankpin and the two laterally adjoining outer crankpins have a complementary inner surface to said outer circumferential surface for a form fit.

9. The crank mechanism according to claim 6, wherein the width and mass of the central middle crankpin equals the sum of the widths and the sum of the masses of the two outer crankpins.

10. The crank mechanism according to claim 6 for the use in an in-line boxer engine comprising two or more pairs of two diametrically opposed cylinders positioned side by side in the longitudinal direction of the crankshaft.

11. A crank mechanism for the use in an in-line boxer engine comprising:
a pair of two diametrically opposed cylinders,
a crankshaft,
a piston for each of the diametrically opposed cylinder,
a corresponding connecting rod for each of the diametrically opposed cylinder,
whereas one of the connecting rods has a first piston connecting portion with a gudgeon pin bearing at one end and a single crankshaft bearing portion at the other end, and
whereas the other connecting rod has a second piston connecting portion with a gudgeon pin bearing at one end and a forked crankshaft bearing portion at the other end that bifurcates into two spaced limbs, which surround the single crankshaft bearing portion with the two ends of said limbs,
wherein the crankshaft has a cylindrical central middle crankpin affixed in a manner that its axis is eccentric and parallel offset relative to the longitudinal axis of the crankshaft, which central middle crankpin is directly adjoined on both of its sides by two cylindrical outer crankpins, which outer crankpins are eccentric and parallel offset relative to the longitudinal axis of the crankshaft such that the two outer crankpins are arranged on the same longitudinal axis and such that a connecting line starting perpendicularly from this outer crankpin longitudinal axis and crossing the eccentric longitudinal axis of the central middle crankpin would also intersect the longitudinal axis of the crankshaft,
wherein between the central crankpin and each adjoining outer crankpin is formed a cross-sectional area by overlapping partial side surface areas of the central crankpin and the respective adjoining outer crankpin, and
wherein the single crankshaft bearing portion as well as the forked crankshaft bearing portion have cylindrical inner bearing surfaces which are mounted on the respective crankpins.

12. The crank mechanism according to claim 11, wherein the single crankshaft bearing portion and the forked crankshaft bearing portion each comprise a semi-enclosing bearing shell that is associated with the respective connecting rod, and a further semi-enclosing bearing shell for closing off the respective crankshaft bearing portions together with connecting elements, joining the further semi-enclosing bearing shells with the said semi-enclosing bearing shells of the connecting rods to provide for a rotary bearing of the respective associated crankpins.

13. The crank mechanism according to claim 11, wherein the single crankshaft bearing portion has one cylindrical inner bearing surface configured for a rotary bearing of the respective associated crankpin, wherein the forked crankshaft bearing portion has two cylindrical inner bearing surfaces configured for a rotary bearing of the two respective associated crankpins, wherein the crankshaft has a central shaft with an outer circumferential surface along the longitudinal axis of the crankshaft, and wherein the central middle crankpin and the two laterally adjoining outer crankpins have a complementary inner surface to said outer circumferential surface for a form fit.

14. The crank mechanism according to claim 11, wherein the width and mass of the central middle crankpin equals the sum of the widths and the sum of the masses of the two outer crankpins.

15. The crank mechanism according to claim 11 for the use in an in-line boxer engine comprising two or more pairs of two diametrically opposed cylinders positioned side by side in the longitudinal direction of the crankshaft.

* * * * *